Aug. 3, 1965　　　　　A. MESSORI　　　　　3,198,577
ADJUSTABLE SEAT BACK FOR VEHICLE SEATS
Filed July 2, 1963　　　　　　　　　　2 Sheets-Sheet 2
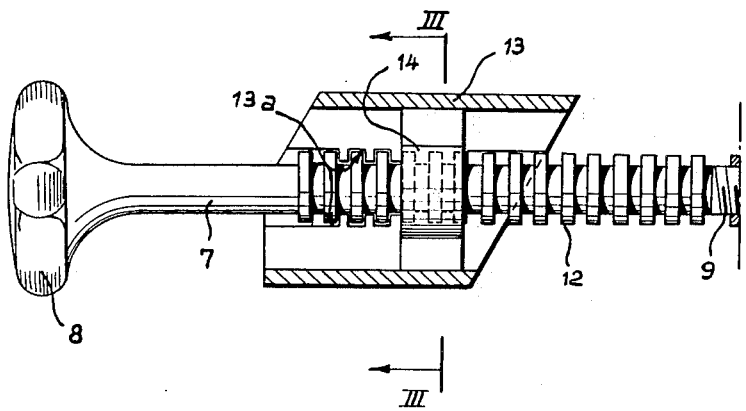
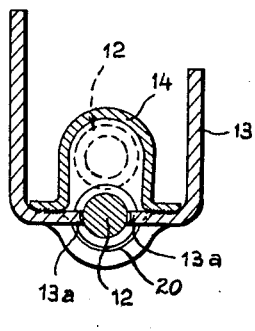
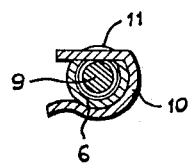

3,198,577
ADJUSTABLE SEAT BACK FOR VEHICLE SEATS
Adolfo Messori, Turin, Italy, assignor to Fiat Società per Azioni, Turin, Italy
Filed July 2, 1963, Ser. No. 292,385
Claims priority, application Italy, July 24, 1962, 14,953/62
5 Claims. (Cl. 297—365)

This invention relates to a device for adjusting the inclination of seat backs, more particularly for vehicle seats.

An object of this invention is to effect either a fine or a wide displacement of the seat back by acting upon the same adjusting member.

The device according to this invention comprises a longitudinal rod articulated to the seat back, capable of oscillation for engagement with, or disengagement from, a member fast with the seat structure. A spring biases the rod tending to keep it in engagement with the member and to simultaneously urge the seat back in a forward direction. The rod is moreover provided with means for adjustment in length in order to effect slight displacements of the seat back.

According to a preferred embodiment of this invention the rod comprises a tubular rear portion articulated to a bottom extension on the seat back structure and a forward portion engaged with the rear portion by a screw coupling, provided with an operating knob, and having a section formed with circular grooves adapted to cooperate with a shaped strap carried by the seat structure.

Further characteristic features of this invention will be understood from the appended detailed description referring to the accompanying drawings, wherein:

FIGURE 2 is a sectional view on an enlarged scale on line II—II of FIGURE 1,

FIGURE 3 is a sectional view on line III—III of FIG. 2, and

FIGURE 4 is a part sectional view on line IV—IV of FIGURE 1.

Figure 1:
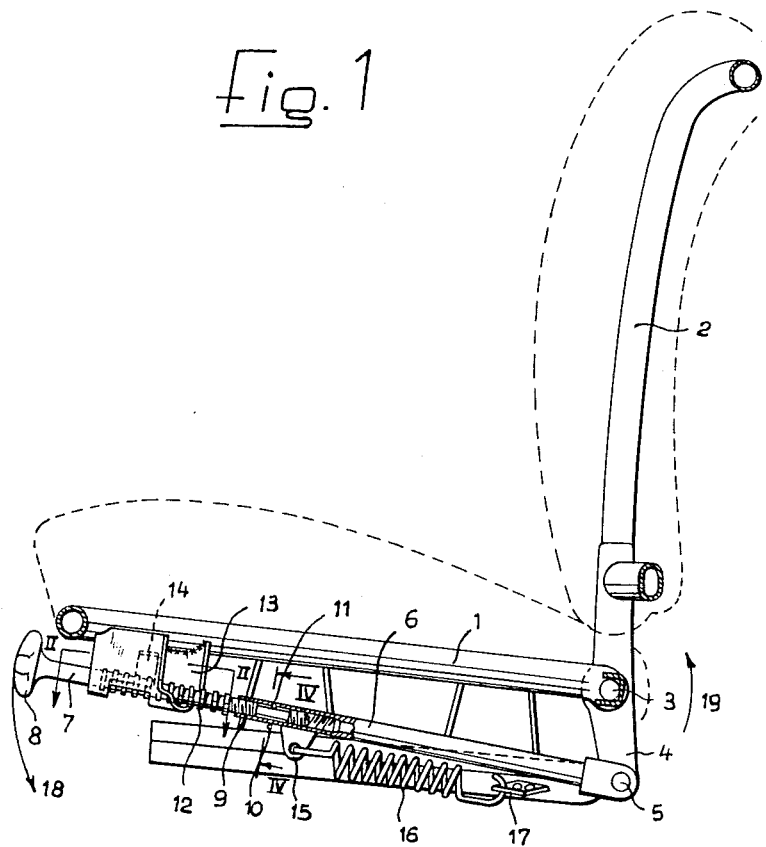
FIGURE 1 is a part sectional elevational view of the device.

The metal structure of a seat, more particularly for motor vehicles is denoted by 1, and the metal structure of the seat back is denoted by 2 and is pivoted at 3 to the seat structure for oscillation about the said pivot for adjustment in inclination.

The seat back structure 2 is provided with a bottom extension 4 reaching beneath the pivot 3, having articulated thereto at 5 a rod extending longitudinally beneath the seat. The rod comprises a rear tubular portion 6 and a portion 7 carrying a forward knob 8 extending to the front of the seat portion and acting as a control member for adjusting the seat back.

The rod portions 6, 7 are interconnected by a screw coupling 9 by means of which the overall length of the rod can be adjusted by rotating the knob 8. A safety spring clip 10 extends through a slot 11 in the tubular portion 6 and limits unscrewing of the forward portion 7 thereby preventing the two portions 6 and 7 from being disconnected from each other.

The forward rod portion 7 is provided with a shaped section 12 formed by a plurality of circular grooves, adapted to selectively engage a strap 13 of suitable profile rigidly attached to the seat structure 1. The strap 13 together with an inner plate 14 bent to an omega shape forms an opening through which the shaped rod portion 12 longitudinally extends, and provides a seat 20 for the rod as shown in FIG. 3.

The bottom portion of the strap is provided with two opposite sets of comb-like teeth 13a, which are positioned to be selectively engaged by the grooves on the shaped section 12 of the rod to rigidly interconnect the rod and seat structure. The area beneath plate 14 is wide enough to allow free sliding of the rod, when the rod is lifted to the position shown in dash lines in FIG. 3.

The tubular rod section 6 carries a plate 15 for attachment of a spring 16 arranged beneath the rod, the opposite end of the spring 16 being attached to a bracket 17 fast with the seat structure. By virtue of its arrangement the spring 16 tends to urge the rod 6–7 to swing about its articulation pivot 5 in the direction of the arrow 18 thereby holding it in engagement with the comb-like teeth 13a, and simultaneously, urges the rod axially rearward to cause the seat back structure 2 to swing in the direction of arrow 19.

The seat back is held in a desired position by interengagement of the grooves and shaped portion 12 on the rod with the comb-like teeth 13a under the action of the spring 16.

In order to effect a fine adjustment in inclination of the seat back it will be sufficient to rotate the knob 8, thereby changing the length of the rod 6–7, while holding the grooves on the shaped portion 12 on the rod interengaged with the teeth 13a.

In order to effect a wide displacement of the seat back the knob 8 is lifted to swing the rod up to clear the comb teeth 13a from the grooves in the shaped section 12, the rod 6–7 being subsequently axially displaced till the seat back takes its desired position. On reaching this position the knob 8 is released and is returned by the spring 16 to its interengaged position with the comb-like teeth 13a.

What I claim is:

1. Device for adjusting the inclination of seat backs, particularly for motor vehicle seats, characterized by the fact that the device comprises a longitudinally extending rod articulated to the seat back, swingable into engagement with and disengagement with a member fast with the seat structure, said rod being urged by a spring tending to hold it in engagement with said member and to move the seat back forwardly, the rod being moreover provided with means for adjustment in length in order to effect fine displacements of the seat back.

2. Device as claimed in claim 1, characterized by the fact that the rod comprises a tubular rear portion articulated to a bottom extension on the back structure and a forward portion engaging with the rear portion by means of a screw coupling provided with an operating knob, and a shaped section formed with circular grooves adapted to cooperate with a shaped strap carried by the seat structure.

3. Device as claimed in claim 2, characterized by the fact that the shaped strap forms together with an inner plate an opening including in its bottom portion a seat with two opposite comb-like teeth sets in order to selectively engage the grooved rod section, the top portion of the opening being wide enough to allow free axial movement of the rod.

4. Device as claimed in claim 1, characterized by the fact that the rod extends longitudinally beneath the seat, the rod provided with a forward control knob at the front of the seat structure.

5. Device as claimed in claim 2, characterized by the fact that a safety spring clip is provided at the screw coupling for the two rod sections to prevent the two sections from becoming disconnected.

References Cited by the Examiner
UNITED STATES PATENTS

| | | | |
|---|---|---|---|
| 685,371 | 10/01 | Davis | 297—365 |
| 2,790,487 | 4/57 | Gebelius | 297—365 |
| 3,024,067 | 3/62 | Brandoli | 297—365 |

FRANK B. SHERRY, *Primary Examiner.*